United States Patent
Thebault et al.

(10) Patent No.: US 9,919,685 B2
(45) Date of Patent: Mar. 20, 2018

(54) WINDSCREEN WIPER FOR MOTOR VEHICLES

(71) Applicant: Valeo Systèmes d'Essuyage, Le Mesnil Saint Denis (FR)

(72) Inventors: Denis Thebault, Clermont Ferrand (FR); Guillaume Barret, Laps (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 74 days.

(21) Appl. No.: 14/932,448

(22) Filed: Nov. 4, 2015

(65) Prior Publication Data

US 2016/0129890 A1 May 12, 2016

(30) Foreign Application Priority Data

Nov. 7, 2014 (FR) ...................................... 1460752

(51) Int. Cl.
  *B60S 1/38* (2006.01)
  *B60S 1/52* (2006.01)

(52) U.S. Cl.
  CPC ................ *B60S 1/524* (2013.01); *B60S 1/38* (2013.01); *B60S 1/3862* (2013.01); *B60S 1/3877* (2013.01); *B60S 2001/3836* (2013.01)

(58) Field of Classification Search
  CPC ...... B60S 1/3877; B60S 1/524; B60S 1/3808; B60S 1/3879; B60S 1/3881
  USPC ....................................................... 15/250.04
  See application file for complete search history.

(56) References Cited

U.S. PATENT DOCUMENTS

| 8,621,705 B1 * | 1/2014 | Valeanu | B60S 1/3881 |
| | | | 15/250.001 |
| 2006/0265830 A1 * | 11/2006 | Walworth | B60S 1/38 |
| | | | 15/236.02 |

FOREIGN PATENT DOCUMENTS

| CA | 2879853 A1 * | 2/2014 | .......... B60S 1/3808 |
| DE | 10000372 A1 * | 8/2001 | .......... B60S 1/3806 |
| DE | 102005054142 A1 | 5/2007 | |
| DE | 102007050171 A1 | 1/2009 | |
| DE | 10 2011 050104 A1 | 11/2012 | |
| DE | 102011054066 A1 * | 4/2013 | .............. B60S 1/522 |
| FR | 2 923 785 A1 | 5/2009 | |
| WO | 2006088808 A1 | 8/2006 | |
| WO | WO 2010000547 A2 * | 1/2010 | .............. B60S 1/381 |

(Continued)

OTHER PUBLICATIONS

DE102011050104A1 (machine translation), 2013.*
Preliminary Search Report issued in corresponding French Application No. 1460752, dated Jun. 26, 2015 (2 pages).

*Primary Examiner* — Andrew A Horton
(74) *Attorney, Agent, or Firm* — Osha Liang LLP

(57) ABSTRACT

A wiper including a support mount for a wiper blade designed to come into contact with the glass to be wiped, and a blade engaging portion for connection of a wiper connector which is arranged between the support mount and the blade, is disclosed. The support mount includes at least two separate cavities which extend longitudinally, the at least two cavities being separate in that at least one first cavity receives a stiffening element and in that a second cavity is adapted to allow the circulation of liquid between a liquid supply means and at least one evacuation hole for said liquid, which is formed in a wall of the said second cavity. The wiper as described has an application in particular in the sector of cleaning motor vehicle windscreens.

15 Claims, 2 Drawing Sheets

(56) References Cited

FOREIGN PATENT DOCUMENTS

WO    WO 2012090635 A1 *  7/2012  ............. B60S 1/381
WO       2014019627 A1    2/2014

* cited by examiner

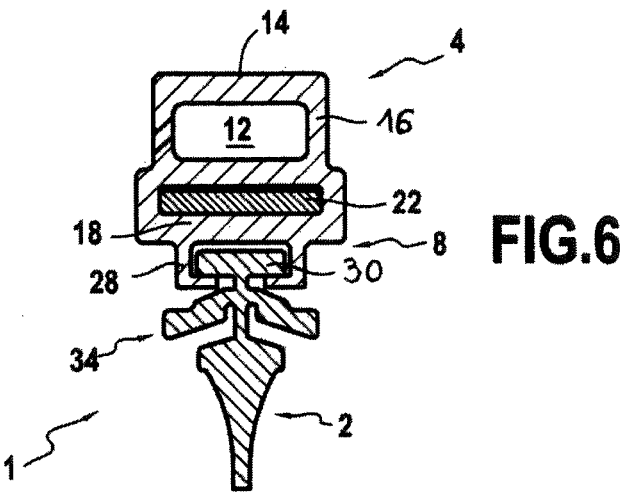
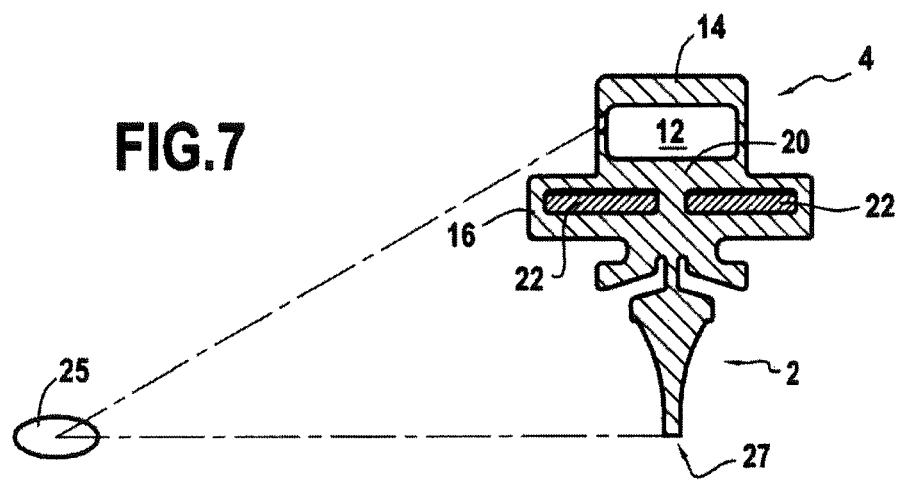
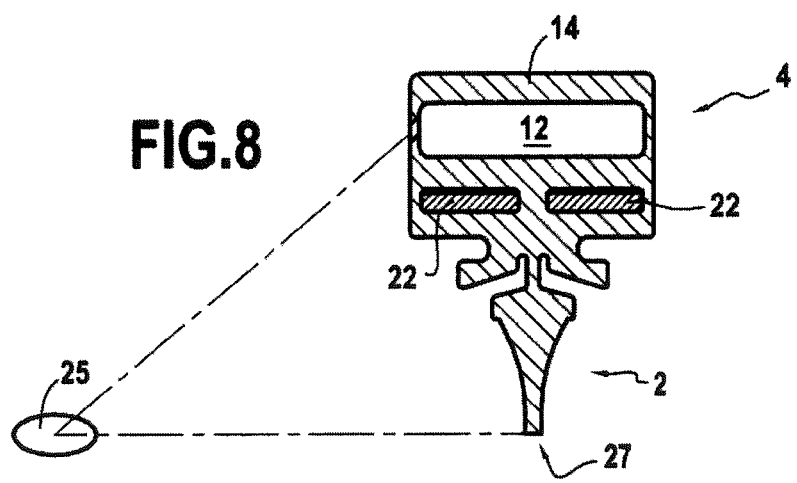

WINDSCREEN WIPER FOR MOTOR VEHICLES

The invention relates to the sector of windscreen wiping, in particular for motor vehicles, and it concerns more particularly the structure of the wipers.

Certain wipers have in a known manner stiffening elements which extend longitudinally along the wiper inside cavities provided for this purpose. These stiffening elements are intended to guarantee the structural strength of the wiper, both for gripping by a windscreen wiper arm joined to it by means of a connector, and for ensuring the stress resistance of the wiper during wiping of the glass. Nowadays there exists a wiper technology for vehicle windscreens which is known by the name of "flat blade", an example of embodiment of which is illustrated in FIG. 1 and a description of which can be found in patent application FR2923785 filed by the Applicant. This flat blade technology consists of a structure based on a single-piece longitudinal part forming a support made of semi-rigid and flexible plastic comprising, on the one hand, a cavity in which a generally metallic stiffening stem, also called vertebra, is housed and, on the other hand, a clamp holding the elastomer wiper blade. In the aforementioned patent application, the single-piece part is rigidly fixed to a central connector allowing connection to the wiper driving mechanism.

Moreover, equipment manufacturers aim nowadays to integrate functions on the wipers and in particular cleaning liquid ejection nozzles for replacing the fixed nozzles arranged conventionally on the bottom of the windscreen. Wipers equipped with external ducts mounted on the wiper structure and provided with ejection holes are known, said ducts being integral with the displacement and to-and-fro movement of the wiper.

The present invention is based on this dual aspect relating to the presence of a wiper stiffening element and the presence of a duct for circulating cleaning liquid integrated in the wiper. The present invention concerns a windscreen wiper, in particular for windscreens of motor vehicles, of the type comprising a support mount for a wiper blade designed to come into contact with the glass to be wiped, a blade engaging portion for connection of a wiper connector being arranged between the support mount and the blade. According to the invention, the support mount comprises at least two separate cavities which extend longitudinally, the said at least two cavities being separate in that at least one first cavity receives a stiffening element and in that a second cavity is adapted to allow the circulation of liquid between a liquid supply means and at least one evacuation hole for said liquid, which may in particular be formed in a wall of the second cavity.

What is proposed therefore is a blade which has two separate functional zones for performing, on the one hand, a function of structurally strengthening the blade and, on the other hand, a function of projecting cleaning liquid, integrated in the wiper, all of this being provided within the volume of the wiper body, without adversely affecting either the size or the appearance of the assembly.

According to the invention, the first and second cavities extend in the thickness of the support mount one above the other, along a vertical axis aligned with the wiper blade. And according to a preferred embodiment of the invention, the first cavity is arranged below the second cavity, and in this case it may be envisaged that the first cavity has a width greater than the width of the second cavity. "Width" is understood as meaning the dimension along the transverse axis which is both perpendicular to the longitudinal axis of the wiper and to the vertical axis, substantially at right angles to the plane of the glass to be wiped.

It may also be envisaged that the widths of the two cavities are substantially the same.

According to a set of characteristics of the invention, the wiper advantageously has a symmetrical form in relation to a plane of longitudinal and vertical symmetry forming a vertical mid-plane of the wiper, and the separate cavities are arranged so as to be each centred on the vertical mid-plane of the wiper.

It may also be envisaged that the support mount has more than one cavity, in particular two cavities, each first cavity being designed to house a separate stiffening element. In this case, the first cavities may be arranged in the support mount side-by-side, at the same height.

According to characteristic features of the invention, at least one of the walls defining longitudinally the second cavity is substantially vertical, and the evacuation hole or holes formed in this substantially vertical wall has/have an inclination, from the inside of the second cavity towards the outside of the wiper, in the direction of the glass to be wiped.

The wiper blade, which is made of rubber, has a heel which is engaged on the support mount and a lip, the free end of which is designed to make contact with the glass to be wiped.

It may be envisaged that either this heel is made as one piece with the support mount or the support mount has a retaining rail inside which the heel of the wiper blade is designed to be inserted, the wiper blade and/or the support mount being advantageously made by means of extrusion, moulding or injection.

The invention also relates to a wiping device in which a windscreen wiper arm rotationally driven by motorized means supports, by means of a connector, a wiper such as that described above, the said connector being designed to grip the blade in the region of its engaging portion.

Further characteristic features and advantages of the present invention will emerge more clearly with the aid of the description and the drawings in which:

FIG. 6 is a cross-sectional end view of the wiper according to a third embodiment; and FIGS. 7 and 8 are diagrams illustrating a geometrical feature applied to the wipers according to the invention.

Figure 1:
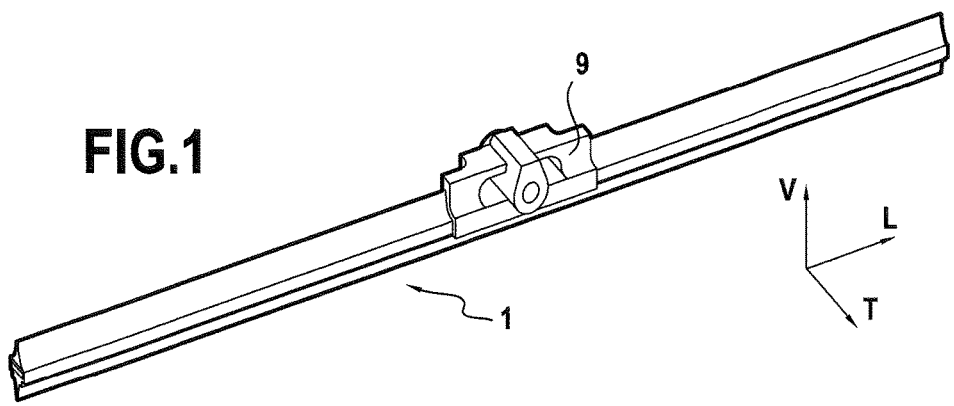
FIG. 1 is a perspective view of a wiper which has, mounted on the centre thereof, a connector designed to ensure the connection between the said wiper and a windscreen wiper arm (not shown)

In the description below and in the claims, reference will be made, by way of a non-limiting example, to the orientation of the set of three axes L, V, T indicated in FIG. 1 and corresponding to the Longitudinal direction (main direction of the windscreen wiper), Vertical direction and Transverse direction (it being understood on the one hand that, in the illustration shown, the Transverse direction also corresponds to the horizontal direction, the wiper being shown in a position where the angle of attack is equal to zero, namely the wiper is in the rest position, not constrained against the glass to be wiped, and it being understood on the other hand that, when the wiper is applied against the glass to be wiped, the Vertical and Transverse directions are inclined at an angle corresponding to the angle of the windscreen).

A wiper 1 according to the invention comprises in particular a wiper blade 2, a free end of which is designed to be pressed against the glass to be wiped, and a support mount 4 with a longitudinal main orientation, which comprises a central body 6 and a blade engaging portion 8.

As shown in FIG. 1, such a type of wiper is designed to be mounted on a windscreen wiper arm (not shown here) by means of a connector 9 which is clamped on the wiper in the region of the portion for engaging the blade on the support mount. It can be understood that types of connectors other than the central connector shown could be used with the wiper according to the invention.

Below different embodiments of a wiper according to the invention will be described and it should be noted that parts and components which are identical, similar or alike will be indicated by the same reference numbers.

According to the invention, in all the embodiments, the wiper comprises a support mount 4 which is specific in that the central body has at least two separate cavities 10 and 12 provided in the thickness of the body.

The body has a top wall 14, opposite to the wiper blade, two side walls 16 which extend substantially perpendicularly with respect to the upper wall in the direction of the wiper blade as far as a bottom wall 18 substantially parallel to the top wall. The body also has a central wall 20, which is parallel to the top and bottom walls and which is common to the two cavities formed in the thickness of the body.

The central body 6 has a general design symmetry in relation to the vertical mid-plane PVM which is also the plane of symmetry of the wiper blade 2. Below, the terms "width and "height" of the body correspond to the distances separating the two side walls and the top and bottom walls, respectively.

A first cavity 10 is formed longitudinally, at least partially along the mount, between the bottom wall, the side walls and the central wall and it has dimensions which are adapted to allow the seating of a stiffening element 22 consisting of a flat, flexible, vertebra type.

A second cavity 12 is also formed longitudinally at least partially along the support mount, separately from the first cavity 10, between the central wall, the side walls and the top wall, and this second cavity is adapted to allow the circulation of liquid between a liquid supply means and at least one evacuation hole 24 for the said liquid, formed in one of the side walls 16 of the said second cavity. It can be understood that the integration of a liquid propulsion device in the wiper is of particular interest when several evacuation holes are provided in series along the wiper, and this even if only one evacuation hole is shown in the figures. Moreover, it may be envisaged arranging evacuation holes on one side or the other side of the second cavity, so as to be able to propel the liquid upstream of the wiper blade whatever its direction of displacement.

As can be seen in the figures, it is worth noting according to the invention that the two cavities extend in the thickness of the support mount above the engaging portion 8, namely the engaging portion extends between the free end of the wiper blade and the first and second cavities.

The stiffening element 22 consists of a flexible metal blade with a rectangular cross section, advantageously seated inside the first cavity with play, so as to allow small relative movements in particular in the longitudinal direction. This gives the wiper its elasticity in the vertical and longitudinal plane allowing it to adapt to the shape, and in particular to the curvature, of the outer side of the glass to be wiped against which the wiper rests.

The wiper blade is formed by a flexible elastomer profile which in a known manner has a tapered form, its free end being designed to come into contact with the surface, in this case a windscreen of a motor vehicle, to be cleaned.

According to different embodiments, three of which are shown by way of example below, the form of the body of the support mount or the form of the engaging portion may be varied, it being understood that the presence of at least one first cavity housing a stiffening element and a second cavity forming a cleaning liquid channel will be maintained.

Figure 2:
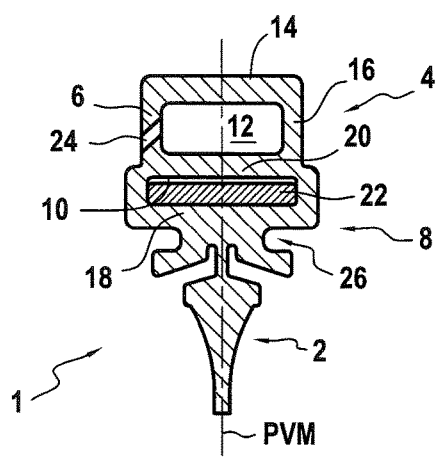
FIGS. 2 and 3 are a cross-sectional end view and perspective view, respectively, of the wiper according to a first embodiment of the invention.
Figure 3:
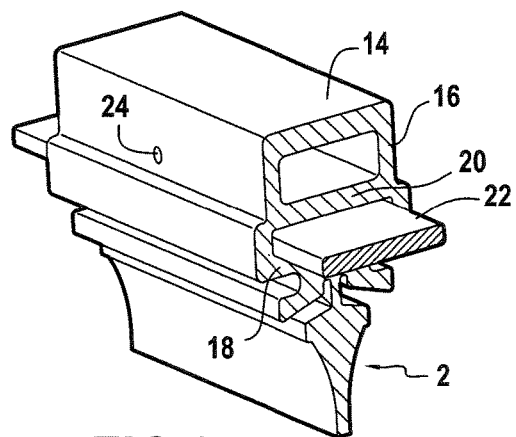

In a first embodiment, shown in FIGS. 2 and 3, the central body comprises a first cavity arranged vertically underneath a second cavity and it may be noted that the width of the first cavity is greater than the width of the second cavity. The body of the mount has a corresponding external profile, with a greater width in its bottom half corresponding to the first cavity than in its top half corresponding to the second cavity. In this way, the side walls of the bottom half project transversely beyond the side walls of the top half.

Each liquid evacuation hole formed in one of the side walls is inclined in relation to the transverse direction, so that the liquid which flows out from the second cavity towards the glass is projected downwards, the end of the hole emerging inside the second cavity being higher than the end of the hole emerging outside of the wiper. The inclination is calculated so that the liquid is correctly projected upstream of the wiper when the latter is moving and so that a laser drilling tool may perform the operation with the appropriate drilling angle without the laser being hindered by a part of the central body.

In the engaging portion, the central body and the wiper blade are here made as one piece. The smaller width of the blade results in the formation of a transverse recess 26 in this engaging portion which provides a grip, in particular in the region of the bottom wall of the body, for the connector as shown by way of example in FIG. 1, the grip for the connector being favoured by the transverse extension of the bottom half of the central body.

Figure 4:
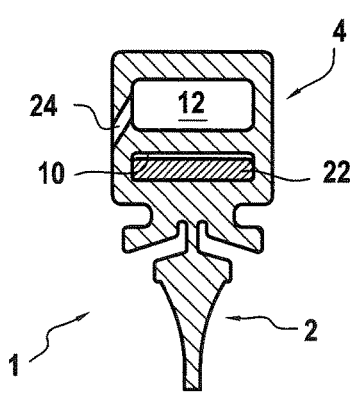
FIGS. 4 and 5 are a cross-sectional end view and perspective view, respectively, of the wiper according to a second embodiment of the invention.
Figure 5:
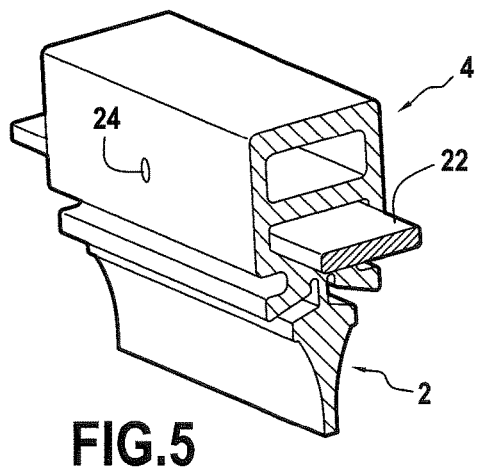

In a second embodiment, shown in FIGS. 4 and 5, in this case it is envisaged that the width of the first cavity 10 is the same as the width of the second cavity 12. The side walls 16 of the central body 6 are vertical. In addition to offering a greater transverse compactness, the wiper according to this second embodiment may be provided with liquid evacuation holes 24 with an inclination having a component more vertical than the inclination of the evacuation holes in the wiper according to the first embodiment. As illustrated in FIGS. 7 and 8, it can be understood that the presence of a protrusion formed on the body between the liquid evacuation hole and the glass to be wiped means that, owing to the volume of the drilling tool designed to form the evacuation hole, this evacuation hole must be inclined closer to a longitudinal and transverse plane so as to move away the point of impact 25 of the liquid ejected onto the glass in the zone 27 where the wiper makes contact with the glass.

A third embodiment, shown in FIG. 6, will now be described. The wiper differs from the first embodiment in the region of the engaging portion. Whereas the engaging portion consisted of the blade joining zone formed as one piece with the central body, here it consists of a specific zone formed by a retaining rail 28 mounted on the body and able to slidingly receive a heel 30 of the wiper blade.

The wiper blade is, as before, made of rubber or a natural or synthetic material, by means of extrusion or moulding. It comprises mainly a heel 30 and a lip 32 which are connected together by a middle part with a smaller cross section, forming a hinge 24.

The central body is extended vertically downwards underneath its bottom side by portions of two opposite ribs with an L-shaped cross section forming hooks which define a retaining rail 28 forming a seat with a rectangular cross section inside which the solid heel 30, with rectangular cross section, of the wiper blade is received with play.

It can be understood that, in this case, which allows in particular the wiper blade to be changed when it is worn without changing the whole of the wiper, the central body may be made differently from the wiper blade, for example by means of moulding in rigid or semi-rigid plastic, while the blade is obtained by means of extrusion, moulding or injection.

The wiper may also comprise an upper aerodynamic deflector or spoiler, not shown here, which, owing to its form and its construction using rigid or flexible material, allows the aerodynamic performance of the wiper to be optimized. It will be known to provide means for fixing the deflector on the outer side of the upper wall 14 of the wiper body.

It has been pointed out in the description of the different embodiments that the first and second cavities extend longitudinally along the axis of the wiper and it may be understood that they extend continuously from one longitudinal end of the wiper to the other. However, it can be imagined, without departing from the scope of the invention, that the first and second cavities may extend one above the other along a limited portion of the wiper, in particular owing to the fact that the liquid channelling duct only extends along a limited portion of the wiper, depending for example on the point where the cleaning liquid supply pipe is situated.

In another embodiment, shown in FIGS. 7 and 8, used above to explain the relationship between the angle of inclination of the evacuation hole and the zone where the liquid strikes the glass, it may be envisaged that the central body of the mount comprises more than one first cavity 10, for example two cavities, each housing a separate stiffening element 22. These first cavities may be arranged alongside each other as shown, or else one above the other, whereby in this latter case these first cavities may be arranged vertically on either side of the second cavity.

The above description clearly explains how the invention may achieve its aims and in particular provide a wiper having two receiving cavities for housing there, respectively, a first element which has the function of stiffening the wiper as a whole and ensuring its strength in relation to the arm which displaces it along the glass to be wiped, and a second element which has the function of allowing the circulation of liquid so as to provide a system for projecting liquid onto the glass, which is integrated in the wiper.

Advantageously the two cavities extend in the thickness of the support mount above the engaging portion, namely the engaging portion extends between the free end of the wiper blade and the first and second cavities. It is worth noting that, on the one hand, the stiffening elements are positioned in the central body of the mount for holding the unit despite the stresses transmitted by the glass, and it is worth noting, on the other hand, that the cavity forming a liquid circulation duct is arranged beyond the engaging portion, so that these liquid ejection means are positioned at an optimum distance from the glass to be cleaned, without however the ejection angle created by the drilling angle preventing liquid from being projected into the vicinity of the blade. It may be stated that, in each of the embodiments illustrated, the first cavity housing the stiffening element is situated below the second cavity forming the liquid channel. In a variant not shown, it may be envisaged that the body of the mount comprises a first cavity arranged above the second cavity. An advantage may be obtained in this arrangement where the evacuation holes for the cleaning liquid are situated closer to the glass to be wiped, it being understood that both the cavities are arranged above the engaging portion.

Of course, various modifications may be made by the person skilled in the art to the structures of the wiper, insofar as it remains within the scope of this double feature where a wiper stiffening element is present and an internal duct for circulation of cleaning liquid is present and also a wiper which has two separate functional zones for performing each of these functions is proposed. The embodiments which have been described in detail above do not limit the invention. In any case the invention is understood as not being limited to the embodiments specifically described in this document and embraces in particular all equivalent means and any combination technically employing these means.

The invention claimed is:

1. A windscreen wiper for windscreens of motor vehicles, comprising:
a support mount connected to a wiper blade designed to come into contact with glass to be wiped, a blade engaging portion directly connected to a wiper connector being arranged between the support mount and the blade,
wherein the support mount comprises at least two separate cavities which extend longitudinally, the said at least two cavities being separate in that the at least two separate cavities comprise at least one first cavity receiving a stiffening element and a second cavity adapted to allow the circulation of liquid between a liquid supply means and at least one evacuation hole for said liquid,
wherein widths of the at least one first cavity which receives the stiffening element and the second cavity which allows the circulation of liquid are substantially the same,
wherein the width of each of the at least one first cavity and the second cavity is measured as a distance separating, and wherein the side walls of the at least one first cavity have a height equal to a height of the stiffening element two side walls of the corresponding cavity.

2. The wiper according to claim 1, wherein the first cavity and the second cavity extend inside the support mount one above the other, along a vertical axis aligned with the wiper blade.

3. The wiper according to claim 2, wherein the first cavity is arranged above the second cavity.

4. The wiper according to claim 1, wherein the width of the first cavity is greater than the width of the second cavity.

5. The wiper according to claim 1, wherein the wiper has a symmetrical form in relation to a plane of longitudinal and vertical symmetry, forming a vertical mid-plane of the wiper.

6. The wiper according to claim 5, wherein the separate cavities are arranged so as to be each centred on the vertical mid-plane of the wiper.

7. The wiper according to claim 1, wherein the at least one first cavity comprises two cavities, each cavity being designed to house a separate stiffening element.

8. The wiper according to claim 7, wherein the first cavities are arranged in the support mount side-by-side, at the same height.

9. The wiper according to claim 1, wherein the evacuation hole for the said liquid is formed in one of the two side walls of the said second cavity.

10. The wiper according to claim 1, wherein at least one of the two side walls defining longitudinally the second cavity is substantially vertical, the at least one evacuation hole being formed in the said substantially vertical wall so as to have an inclination, from the inside of the second cavity towards the outside of the wiper, in the direction of the glass to be wiped.

11. The wiper according to claim 1, wherein the wiper blade comprises a rubber wiping lip, a free end of which is designed to make contact with the glass to be wiped, and a heel engaged with the support mount.

12. The wiper according to claim 11, wherein the heel is made as one piece with the support mount.

13. The wiper according to claim 11, wherein the support mount comprises a retaining rail inside which the heel is designed to be inserted.

14. The wiper according to claim 13, wherein the wiper blade and/or the support mount is obtained by means of extrusion, injection or moulding.

15. A wiping device in which a windscreen wiper arm is rotationally driven by motorized means supports, using the windscreen wiper according to claim 1.

\* \* \* \* \*